(12) United States Patent
Lin et al.

(10) Patent No.: US 11,182,019 B2
(45) Date of Patent: Nov. 23, 2021

(54) TOUCH SCANNING METHOD

(71) Applicant: Novatek Microelectronics Corp., Hsinchu (TW)

(72) Inventors: Chung-Cher Lin, Hsinchu County (TW); Yun-Hsiang Yeh, Hsinchu County (TW); Ta-Keng Weng, Taichung (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/931,455

(22) Filed: Jul. 17, 2020

(65) Prior Publication Data

US 2021/0286496 A1  Sep. 16, 2021

Related U.S. Application Data

(60) Provisional application No. 62/987,889, filed on Mar. 11, 2020.

(51) Int. Cl.
*G06F 3/041* (2006.01)

(52) U.S. Cl.
CPC .............. *G06F 3/04166* (2019.05)

(58) Field of Classification Search
None
See application file for complete search history.

(56) References Cited

U.S. PATENT DOCUMENTS

2014/0247236 A1*  9/2014 Olivier .............. G06F 3/04166
                                                      345/173
2015/0109227 A1*  4/2015 Shin ................... G06F 3/0446
                                                      345/173

* cited by examiner

*Primary Examiner* — Krishna P Neupane
(74) *Attorney, Agent, or Firm* — JCIPRNET

(57) ABSTRACT

A touch scanning method shortening a first touch latency includes: scanning a Mth column of the N-column touch panel according to a touch scan (TSHD) signal; determining whether the finger is on the Mth column of the N-column touch panel according to a scan data signal; performing a fast done process according to a fast done signal when the finger is on the Mth column of the N-column touch panel; determining whether M equals to N when the finger is not on the Mth column of the N-column touch panel; and resetting M to 1 according to a scan start signal and performing an algorithm according to a finish flag signal.

8 Claims, 5 Drawing Sheets

TOUCH SCANNING METHOD

CROSS-REFERENCE TO RELATED APPLICATION

This application claims the priority benefit of U.S. provisional application Ser. No. 62/987,889, filed on Mar. 11, 2020. The entirety of each of the above-mentioned patent applications is hereby incorporated by reference herein and made a part of this specification.

BACKGROUND

Technical Field

The disclosure relates to a touch scanning method.

Description of Related Art

FIG. 1 shows a conventional touch scanning schematic and timing diagram. A touch controller coupling to a N-column touch panel scans each column of the N-column touch panel according to a touch scan (TSHD) signal from a driver. Generally, the touch controller sequentially scans the N-column touch panel from column 1 to column N and repeats periodically. Take N=9 as an example, the TSHD signal includes a period sequence with numbers 1~9 indicating which column of the 9-column touch panel is being scanned. The touch controller scans the 9-column touch panel with a finger touched according to the TSHD signal and outputs a scan data signal to a microcontroller unit (MCU) performing an algorithm of calculating and reporting a touch coordinate of the finger. The MCU typically performs the algorithm every time after column 1~9 of the 9-column touch panel are scanned.

When the finger touches the column 1 of the 9-column touch panel right after a TSHD 1 period of the TSHD signal as shown in FIG. 1, the touch controller just missed to scan the finger and has to wait until a next TSHD 1 period to scan the finger, and the MCU performs the algorithm after a next TSHD 9 period to calculate and report the touch coordinate of the finger. A time interval from the finger touches the 9-column touch panel to the MCU reports the touch coordinate of the finger is defined as a first touch latency.

Nothing herein should be construed as an admission of knowledge in the prior art of any portion of the present disclosure.

SUMMARY

A touch scanning method shortening the first touch latency is introduced.

In an embodiment of the disclosure, the touch scanning method adapted to scan a finger on a N-column touch panel includes scanning a Mth column of the N-column touch panel according to a touch scan (TSHD) signal; determining whether the finger is on the Mth column of the N-column touch panel according to a scan data signal; performing a fast done process according to a fast done signal when the finger is on the Mth column of the N-column touch panel; determining whether M equals to N when the finger is not on the Mth column of the N-column touch panel; resetting M to 1 according to a scan start signal and performing an algorithm to calculate a touch coordinate of the finger and report the touch coordinate of the finger according to a finish flag signal.

To sum up, the touch scanning method provided by the disclosure shortens the first touch latency by performing the fast done process according to the fast done signal to calculate and report the touch coordinate of the finger when the finger is scanned.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments of the disclosure are described hereinafter with reference to the drawings.

Figure 2:
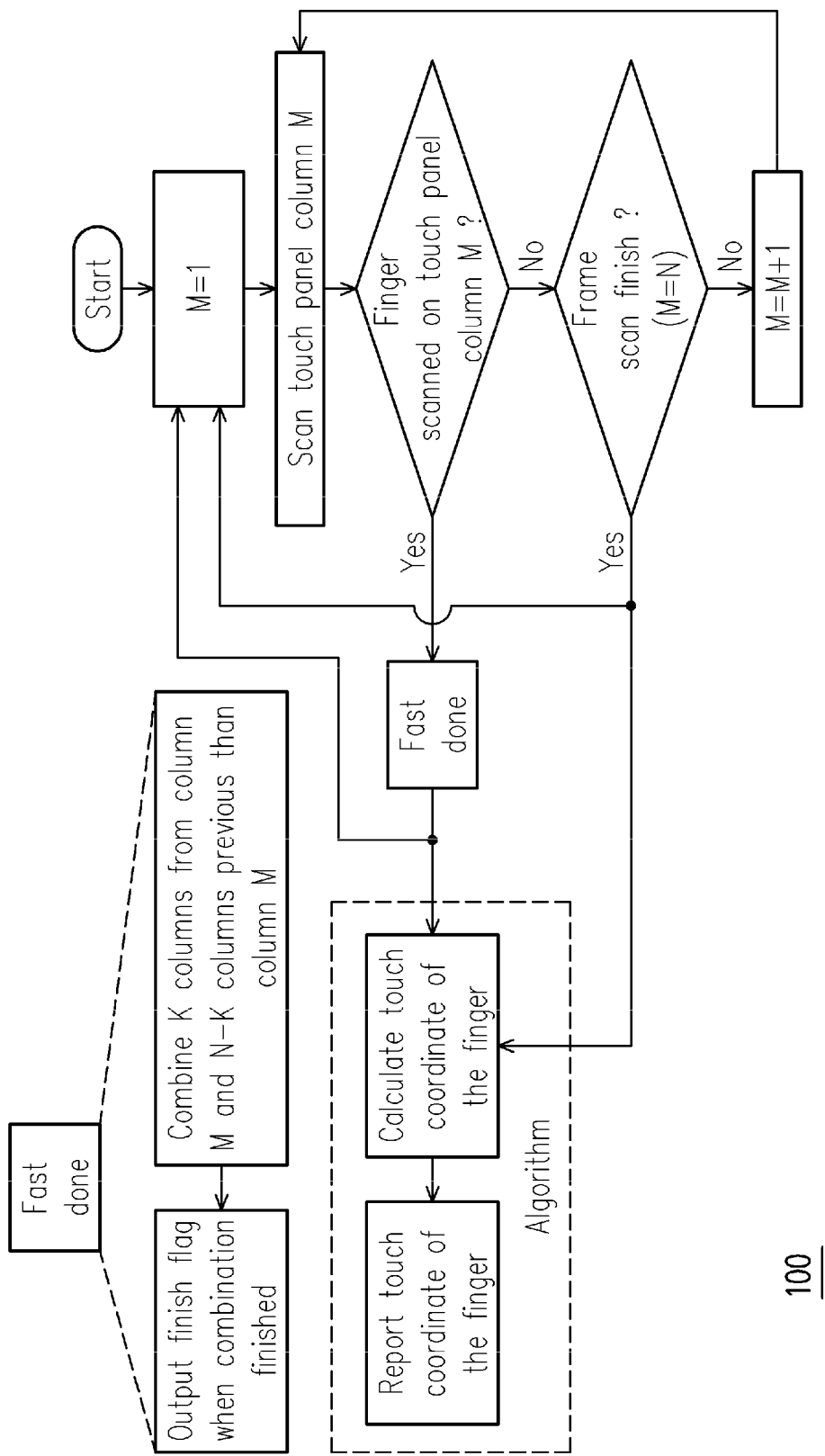
FIG. 2 is a touch scanning method according to an embodiment of the disclosure.
Figure 3:
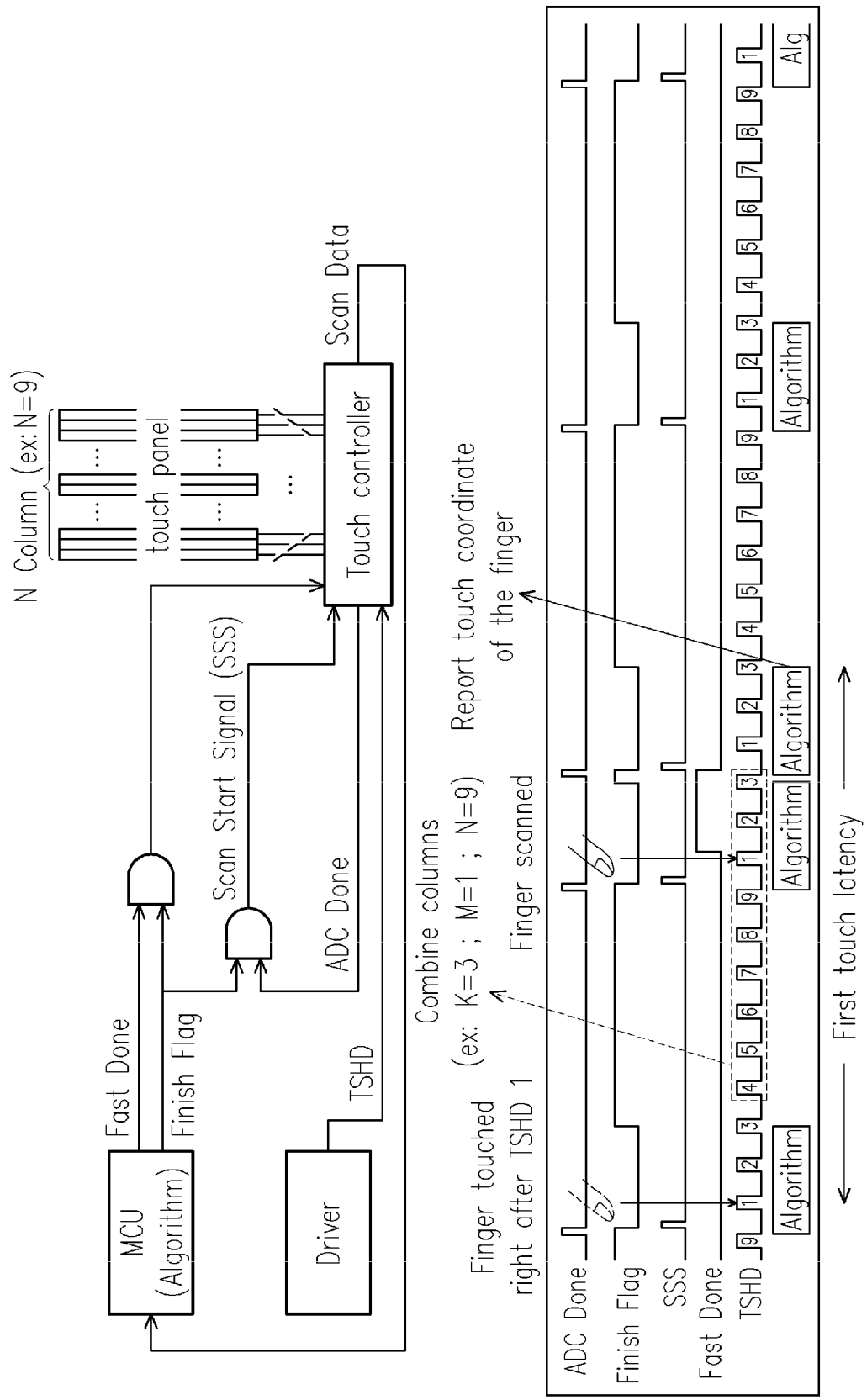
FIG. 3 is a touch scanning schematic and timing diagram according to FIG. 2.

FIG. 2 is a touch scanning method 100 according to a first embodiment of the disclosure. FIG. 3 is a touch scanning schematic and timing diagram according to FIG. 2. Referring to FIG. 2 and FIG. 3, a touch controller scans a column M of a 9-column touch panel during a TSHD M period of a touch scan (TSHD) signal from a driver. For example, the touch controller scans a column 1 of a 9-column touch panel during a TSHD 1 period of the touch scan (TSHD) signal and scans a column 9 of a 9-column touch panel during a TSHD 9 period of the touch scan (TSHD) signal. The TSHD signal includes a period sequence with numbers 1~9 indicating which column of the 9-column touch panel is being scanned. A microcontroller unit (MCU) determines whether a finger is on one of the columns 1 to 9 according to a received scan data signal during TSHD periods 1 to 9.

In the first TSHD periods 1 to 9 of FIG. 3, assuming the finger touched the column 1 of the 9-column touch panel right after the TSHD 1 period of the TSHD signal, such that the touch controller just missed to scan the finger on the column 1 of the 9-column touch panel, which is corresponding to a step of "Finger scanned on touch panel column M(=1)?, No" in FIG. 2. The touch controller continues to scan the column 2 of the 9-column touch panel, which is corresponding to a step of "Frame scan finish? (M=N), No" since M(=1) is not equal to N(=9) and a step of "M=M+1" in FIG. 2. The touch scanning method 100 repeats above steps until the touch controller scans a column 9 of the 9-column touch panel according to the TSHD 9 period of the TSHD signal. When the finger is not scanned on the column 9 of the 9-column touch panel, the step of "Finger scanned on touch panel column M(=9)?, No" and the step of "Frame scan finish? (M=N), Yes (M=N=9)" direct the MCU to perform an algorithm to calculate and report a touch coordinate of the finger according to a finish flag signal (i.e. a step of "Algorithm" in FIG. 2) and direct the touch controller to scan from column 1 (i.e. reset, a step of "M=1" in FIG. 2) according to a scan start signal (SSS), which is a second SSS pulse shown in FIG. 3. The reported touch coordinate would be invalid since the finger is not scanned during the first TSHD periods 1 to 9.

In a second TSHD periods next to the first TSHD periods 1 to 9 of FIG. 3. The touch controller scans the 9-column touch panel from the column 1 again according to the second SSS pulse shown in FIG. 3. The touch controller scans the column 1 of the 9-column touch panel according to a TSHD 1 period of the TSHD signal in the second TSHD periods, and the MCU determines whether the finger is on the column 1 of the 9-column touch panel according to the scan data signal from the touch controller. Since the finger has touched the column 1 of the 9-column touch panel from a time right after the TSHD 1 period in the first TSHD periods 1 to 9, the MCU determines the finger is on the column 1 of the 9-column touch panel according to the scan data signal, which is corresponding to the step of "Finger scanned on touch panel column M(=1)?, Yes" in FIG. 2, and then the MCU performs a fast done process according to a fast done signal as shown in FIG. 3. The fast done process includes a step of "combine K columns from column M(=1) and N(=9)−K columns previous than column M" and a step of "output finish flag when combination finished" as shown in FIG. 2.

Take K=3 for an example, the MCU performs the fast done process according to the fast done signal by combining K(=3) columns (i.e. column 1~column 3) from column M(=1) and N(=9)−K(=3) columns (i.e. column 4~column 9) previous than column M(=1) as shown in FIG. 3. A number of K may be determined according to a process speed of the fast done process performed by the MCU and not limited to 3.

The MCU outputs a finish flag signal when the combination is finished (i.e. right before a falling edge of the fast done signal shown in FIG. 3), and then the MCU performs the algorithm to calculate and report the touch coordinate of the finger according to the finish flag signal, which is corresponding to the step of "Algorithm" shown in FIG. 2. The reported touch coordinate would be valid since the finger is scanned during the second TSHD 1 period next to the first TSHD periods 1 to 9.

A third scan start signal (SSS) pulse generated at a time of a falling edge of the finish flag signal is transmitted to the touch controller after the fast done process, and the touch controller scans from the column 1 of the 9-column touch panel again (corresponding to the step of "M=1" shown in FIG. 2).

Figure 1:
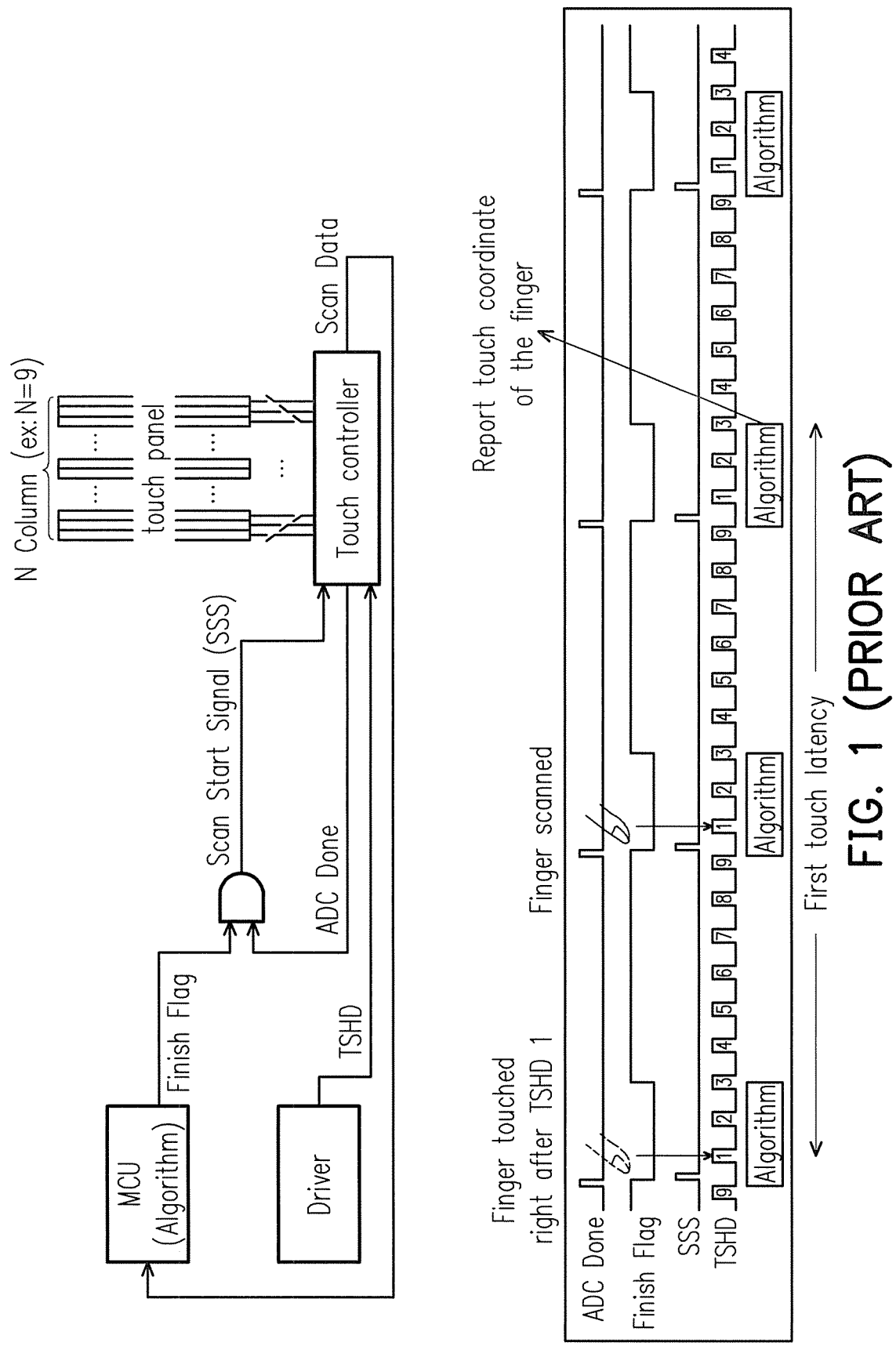
FIG. 1 is a conventional touch scanning schematic and timing diagram.

Comparing FIG. 1 and FIG. 3, the first touch latency of the touch scanning method 100 in FIG. 3 is shorter than the first touch latency of the conventional touch scanning method in FIG. 1.

Figure 4:
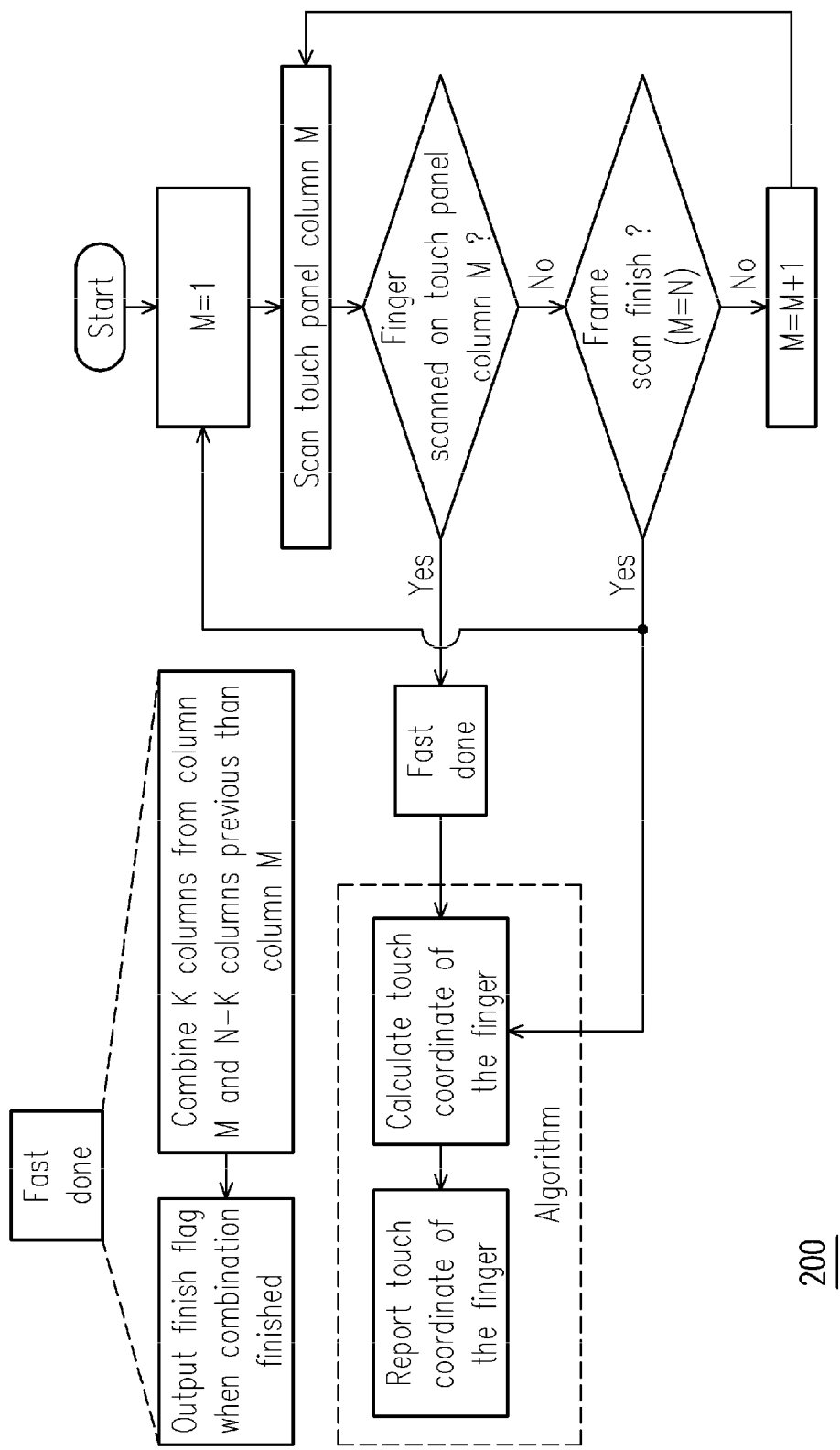
FIG. 4 is a touch scanning method according to another embodiment of the disclosure.
Figure 5:
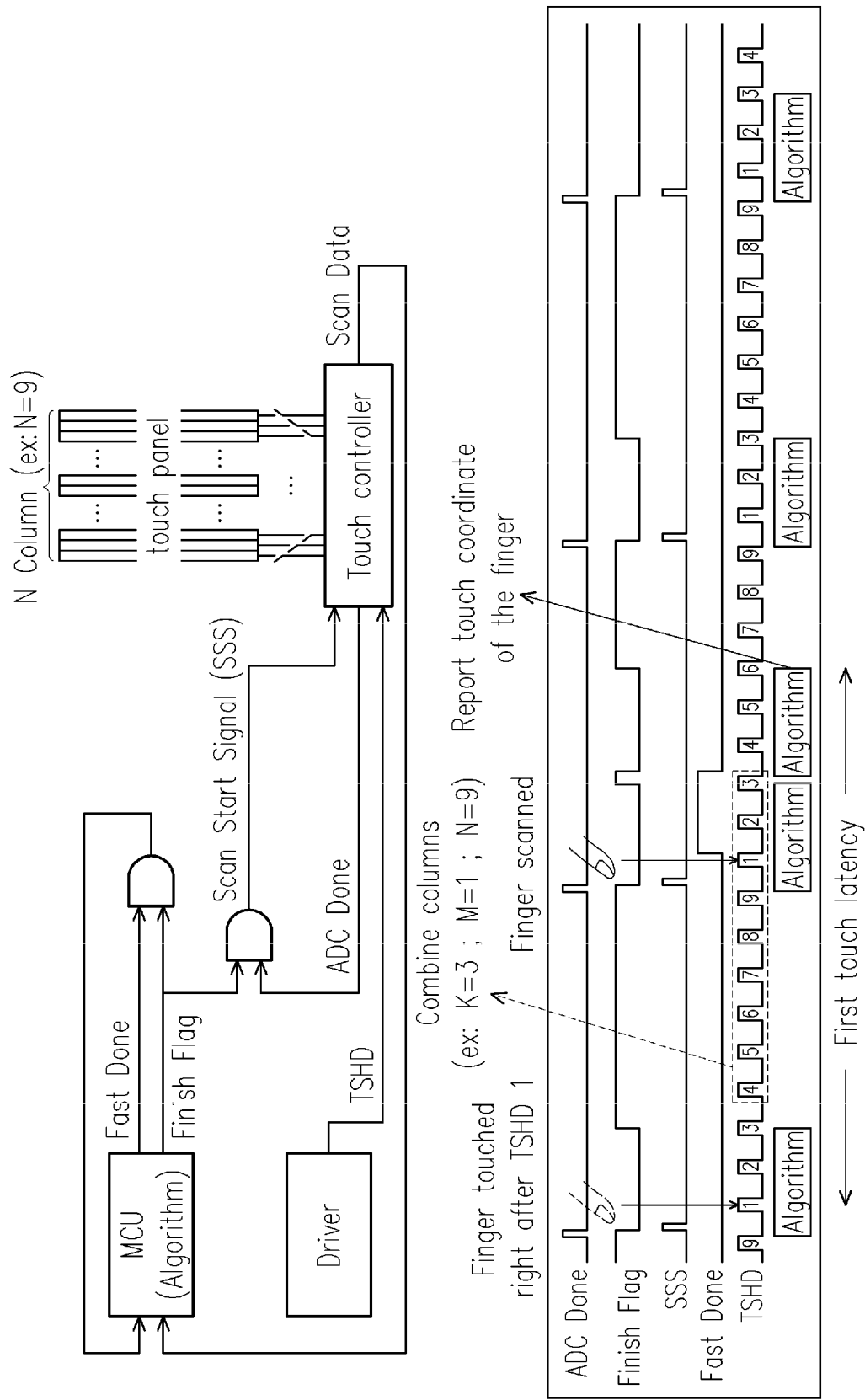
FIG. 5 is a touch scanning schematic and timing diagram according to FIG. 4.

FIG. 4 is a touch scanning method 200 according to a second embodiment of the disclosure. FIG. 5 is a touch scanning schematic and timing diagram according to FIG. 4. Comparing FIG. 2 and FIG. 4, the touch scanning method 100 is similar with the touch scanning method 200 except that the touch controller of the touch scanning method 100 in FIG. 2 scans the 9-column touch panel from the column 1 after the fast done process (i.e. column 1→column 2→column 3→column 1 . . . ) since the scan start signal (SSS) pulse (i.e. the third SSS pulse) is generated at the time of the falling edge of the finish flag signal in FIG. 3. On the contrast, the touch controller of the touch scanning method 200 in FIG. 4 does not scan the 9-column touch panel from the column 1 after the fast done process (i.e. column 1→column 2→column 3→column 4 . . . ) since the scan start signal (SSS) pulse is not generated at the time of the falling edge of the finish flag signal in FIG. 5.

From the above embodiments, the touch scanning method 100 and 200 shorten the first touch latency by performing the fast done process according to the fast done signal to calculate and report the touch coordinate of the finger when the finger is scanned.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch scanning method adapted to scan a finger on a N-column touch panel comprising:
   scanning a Mth column of the N-column touch panel according to a touch scan (TSHD) signal;
   determining whether the finger is on the Mth column of the N-column touch panel according to a scan data signal;
   performing a fast done process comprising a N columns combination according to a fast done signal when the finger is on the Mth column of the N-column touch panel;
   determining whether M equals to N when the finger is not on the Mth column of the N-column touch panel; and
   resetting M to 1 according to a scan start signal and performing an algorithm to calculate a touch coordinate of the finger and report the touch coordinate of the finger according to a finish flag signal,
   wherein the N columns combination comprises combining K columns from the Mth column of the N-column touch panel and N-K columns previous than the Mth column of the N-column touch panel, wherein K is an integer no greater than N.

2. The touch scanning method as claimed in claim 1, wherein performing the fast done process comprises outputting the finish flag signal when the N columns combination is finished.

3. The touch scanning method as claimed in claim 2, wherein performing the fast done process further comprises scanning the N-column touch panel from the first column after the finish flag signal.

4. The touch scanning method as claimed in claim 3, wherein scanning the N-column touch panel from the first column is according to the scan start signal.

5. The touch scanning method as claimed in claim 4, wherein the scan start signal is generated according to a falling edge of the finish flag signal.

6. The touch scanning method as claimed in claim 2, wherein performing the fast done process further comprises scanning the N-column touch panel from the (M+1)th column after the finish flag signal.

7. The touch scanning method as claimed in claim 2, wherein performing the fast done process comprises performing the algorithm to calculate the touch coordinate of the finger and report the touch coordinate of the finger according to the finish flag signal.

8. The touch scanning method as claimed in claim 1, wherein the TSHD signal comprises a period sequence with numbers from 1 to N indicating which column of the N-column touch panel is being scanned.

* * * * *